(12) United States Patent
Ernst (10) Patent No.: US 6,297,451 B1
(45) Date of Patent: Oct. 2, 2001

(54) CONVEYOR OPERATION CONTROL SYSTEM

(75) Inventor: Ronald L. Ernst, St. Clair County, IL (US)

(73) Assignee: Alvey Systems, Inc., St. Louis, MO (US)

( * ) Notice: Subject to any disclaimer, the term of this patent is extended or adjusted under 35 U.S.C. 154(b) by 0 days.

(21) Appl. No.: 09/574,337

(22) Filed: May 20, 2000

Related U.S. Application Data (62) Division of application No. 09/076,178, filed on May 11, 1998.

(51) Int. Cl.$^7$ ................................................. H02G 3/14
(52) U.S. Cl. ................................................. 174/66; 174/67
(58) Field of Search ..................................... 174/66, 67, 48, 174/50, 49; 220/242, 3.8

(56) References Cited

U.S. PATENT DOCUMENTS

| | | | |
|---|---|---|---|
| 2,526,606 | * 10/1950 | Gregg | 174/67 |
| 3,676,974 | * 7/1972 | Daly | 174/48 |
| 4,851,612 | * 7/1989 | Peckham | 174/67 |
| 5,045,640 | * 9/1991 | Riceman | 174/67 |
| 5,389,740 | * 2/1995 | Austin | 174/67 |
| 5,829,554 | * 11/1998 | Benson et al. | 187/414 |

\* cited by examiner

*Primary Examiner*—Dean A. Reichard
*Assistant Examiner*—Angel R. Estrada
(74) *Attorney, Agent, or Firm*—Polster, Lieder, Woodruff & Lucchesi, L.C.

(57) ABSTRACT

A cover assembly for protecting control systems components including a base member to which control system components can be attached and a U-shaped cover having a plurality of fastening members on the top flange and a plurality of hinged members on the bottom flange. The base member has a plurality of longitudinally spaced lower slots and longitudinally spaced upper openings. The top flange of the U-shaped cover includes a plurality of fastening members sized and located to engage the longitudinally spaced upper openings in the base member. The bottom flange of the U-shaped cover includes a plurality of hinge members sized and located to engage the longitudinally spaced lower slots of the base member. The U-shaped cover can include removable lock members on the hinge members to retain the hinge members within the longitudinally spaced lower slots of the base member.

14 Claims, 12 Drawing Sheets

CONVEYOR OPERATION CONTROL SYSTEM

CROSS-REFERENCE TO RELATED APPLICATIONS

This is a divisional of copending application Ser. No. 09/076,178, filed on May 11, 1998.

STATEMENT REGARDING FEDERALLY SPONSORED RESEARCH OR DEVELOPMENT

BACKGROUND OF THE INVENTION

This invention is directed to a control system for detecting the presence of packages that may accumulate on a rollerless conveyor that provides long accumulation zones in the conveyor without sacrificing accumulation density so as to simplify accumulation control zones for sensing packages that may be moved along the conveyor.

The prior art of accumulating packages on a conveyor wherein the package is moved along a plurality of rollers by a chain that is elevated to support the package for movement relative to frame members has means to support the package in a stationary position when not lifted by the chain for transportation to an outlet. Such a conveyor is disclosed in Wyman U.S. Pat. No. 3,930,573 of Jan. 6, 1976.

A variation in the prior art is disclosed in Bowman U.S. Pat. No. 3,934,707 of Jan. 27, 1976 which employs a continuously drawn belt with ways alongside the belt which are movable vertically to vary the relative vertical position between an accumulation position wherein the support surface of the ways is above the conveyor belt causing package accumulation and a package drive position wherein the support surface of the way is below the conveyor belt causing package movement.

The prior art includes a conveyor system of the character in Holt U.S. Pat. No. 4,149,626 of Apr. 17, 1979 in which spaced conveyor surfaces of multiple rollers are occupied by a flat link chain which is vertically movable relative to the spaced roller surfaces at selective portions to move packages.

Furthermore, the prior art Garro U.S. Pat. No. 5,085,311 of Feb. 4, 1992 has disclosed a belt or chain with wear surfaces along both sides of the belt or chain for conveying packages, and apparatus for displacing the belt or chain or the wear surface relative to each other to provide an in-line accumulator having a zero backline pressure.

BRIEF SUMMARY OF THE INVENTION

To overcome the prior art deficiencies it is an important object of this invention in rollerless accumulation conveyors to have a control scheme that enables the use of long accumulation zones without sacrificing accumulation density to reduce the quantity or number of zones required, thereby resulting in fewer elements in a control system.

Another object is to employ a control system that responds to the accumulation of packages at a discharge zone to supervise the performance of the system by delaying removal of conveyor drive contact to obtain a high package density in such zone, and also initiate final conveyor drive removal to prevent package damage once maximum density is obtained.

A further object of the invention is to provide photocell means to exhaust the pressure medium in a control system so as to maximize package accumulation density when the package charge rate is low, and avoiding excessive package line pressure when the charge rate is high.

Another object of the invention is to provide the accumulation conveyor with a control system having a location in a frame to provide a convenient working surface to perform adjustments when the protective cover for the control system is manually opened to allow for service access.

BRIEF DESCRIPTION OF THE SEVERAL VIEWS OF THE DRAWINGS

In the drawings.

Corresponding reference numerals will be used throughout the several figures of the drawings.

DETAILED DESCRIPTION OF THE INVENTION

The following detailed description illustrates the invention by way of example and not by way of limitation. This will clearly enable one skilled in the art to make and use the invention to advantage in its present best mode.

Figure 1:
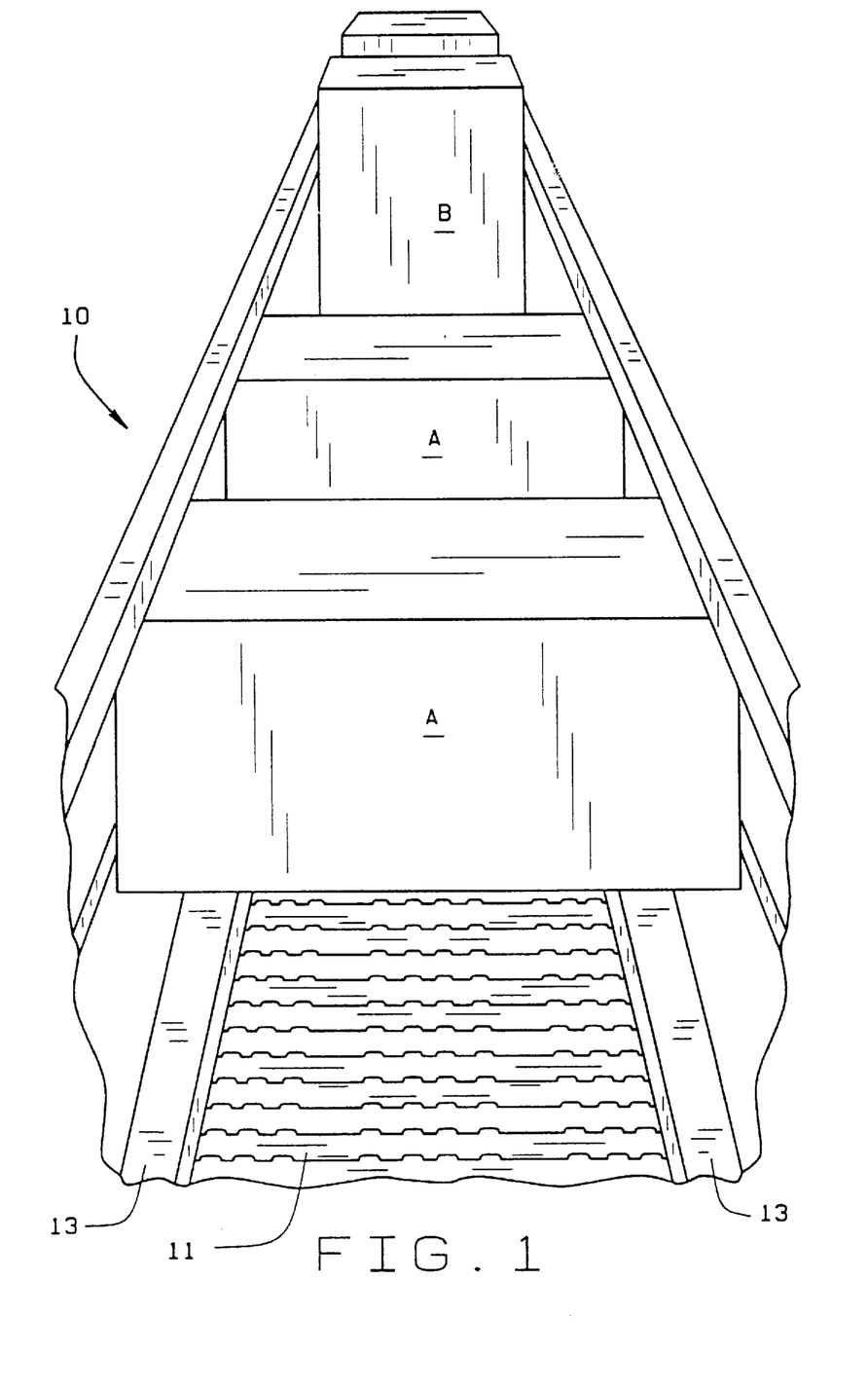
FIG. 1 is a schematic perspective view of a conveyor for moving different sizes of packages to be detailed hereinafter.
Figure 2:
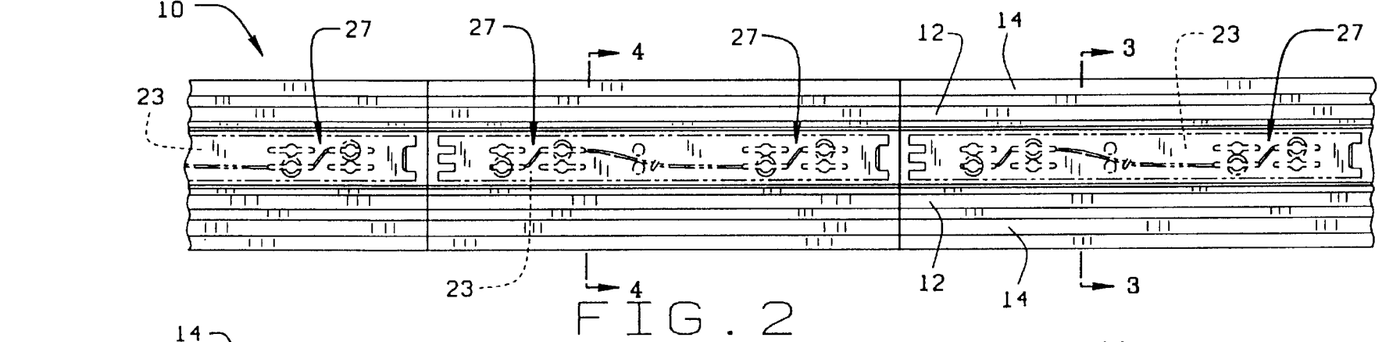
FIG. 2 is a fragmentary longitudinal plan view of the conveyor structure for moving packages seen in FIG. 1.
Figure 3:
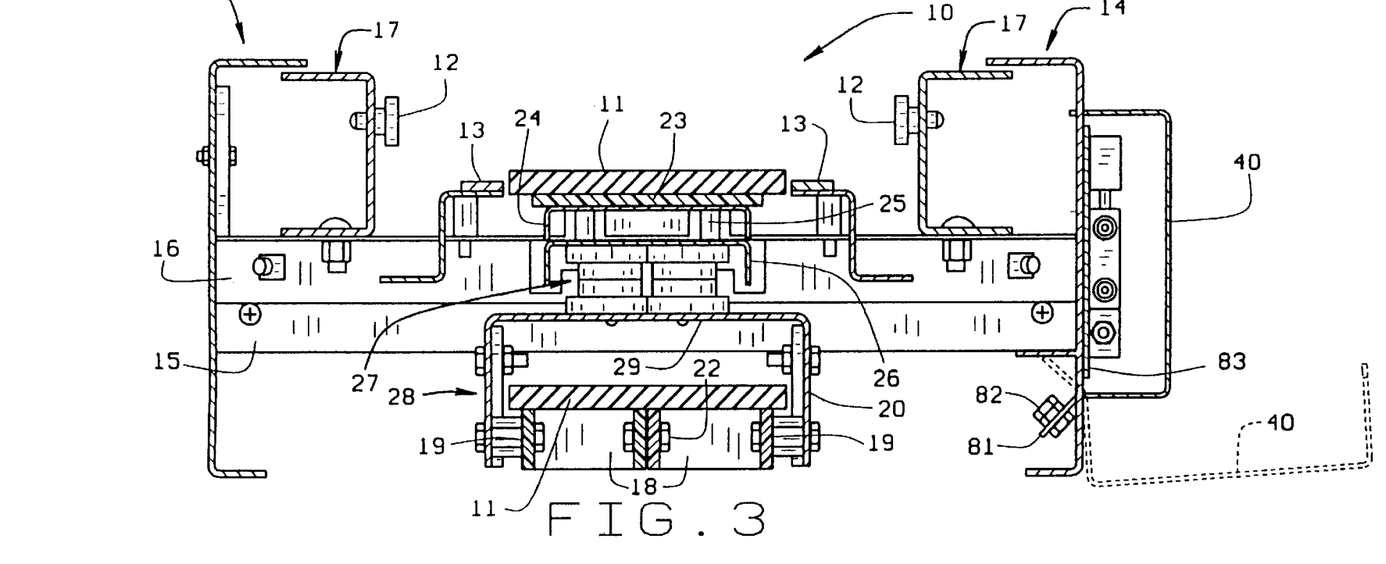
FIG. 3 is an enlarged cross section view of the conveyor structure with the package moving belt seen at line 3—3 in FIG. 2.
Figure 4:
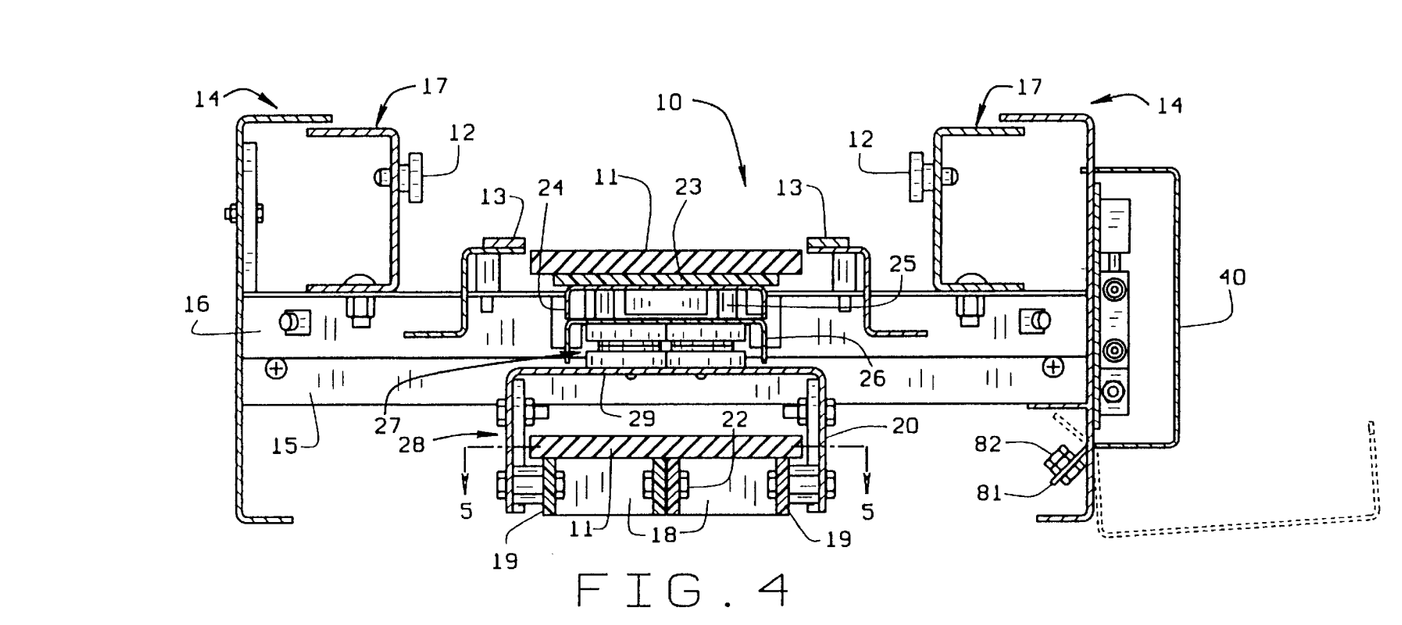
FIG. 4 is an enlarged cross section view of the conveyor structure when the conveyor belt is lowered as seen at line 4—4 in FIG. 2.
Figure 5:
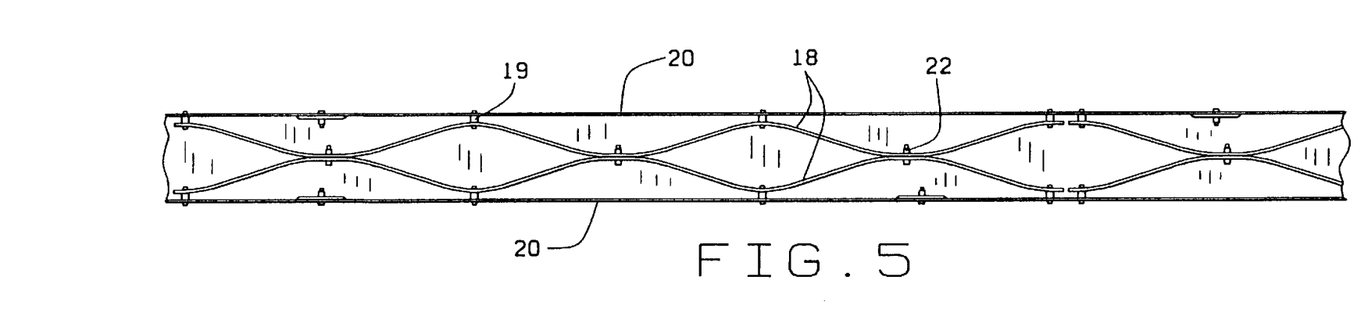
FIG. 5 is a fragmentary plan view of the support for the returning conveyor travel seen at line 5—5 in FIG. 4.

In the view of FIGS. 1, 2 and 3, the conveyor 10 is seen to move different sizes of packages A or B on the surface of the rollerless belt 11 in FIG. 1 centered by side guides 12 seen in FIGS. 3 and 4. When the belt 11 is raised, as in FIG. 3, the package is lifted above stationary skid strips 13. The section view of FIG. 3 shows the conveyor sides 14 connected by a transverse spacer 15 of which sides 14 are supported and in which the upper section 16 carries the guide supports 17 which carry the guides 12. In addition, the spacer section 16 also carries the skid strips 13 at each side of the moving rollerless conveyor belt 11. The return pass of that belt 11 runs over a wear control pair of strips 18 which are directed in a wave form as illustrated in FIG. 5 for the return pass of belt 11. The strips 18 alternately connect at 19 to the sides 20 of a longitudinal channel structure and connect to each other by bolts 22, all as indicated in FIG. 5.

Further with respect to FIG. 3, the rollerless conveyor belt 11 is supported to move over the top of a support plate 23 carried by channel 24. That top plate 23 is formed of a plastic material which provides a smooth low friction surface for the belt 11. The underside of the channel 24 is supported on a system of spacers 25 in contact with a second channel 26. That channel 26 rests on air expansion pad elements 27 which have upper and lower parts aligned over a down-turned deep channel 28 providing side walls 20 and a closed top surface 29 adapted to support the air expansion pad elements. The parts of pads 27 form air expansion cellular elements to provide the desired amount of vertical displacement of the conveyor belt between its recessed or lowered position and its raised or elevated position. In the position seen in FIG. 3, the belt is in its elevated position while in FIG. 4 the belt is in the lowered position due to exhausting of air from the pads 27.

Figure 6:
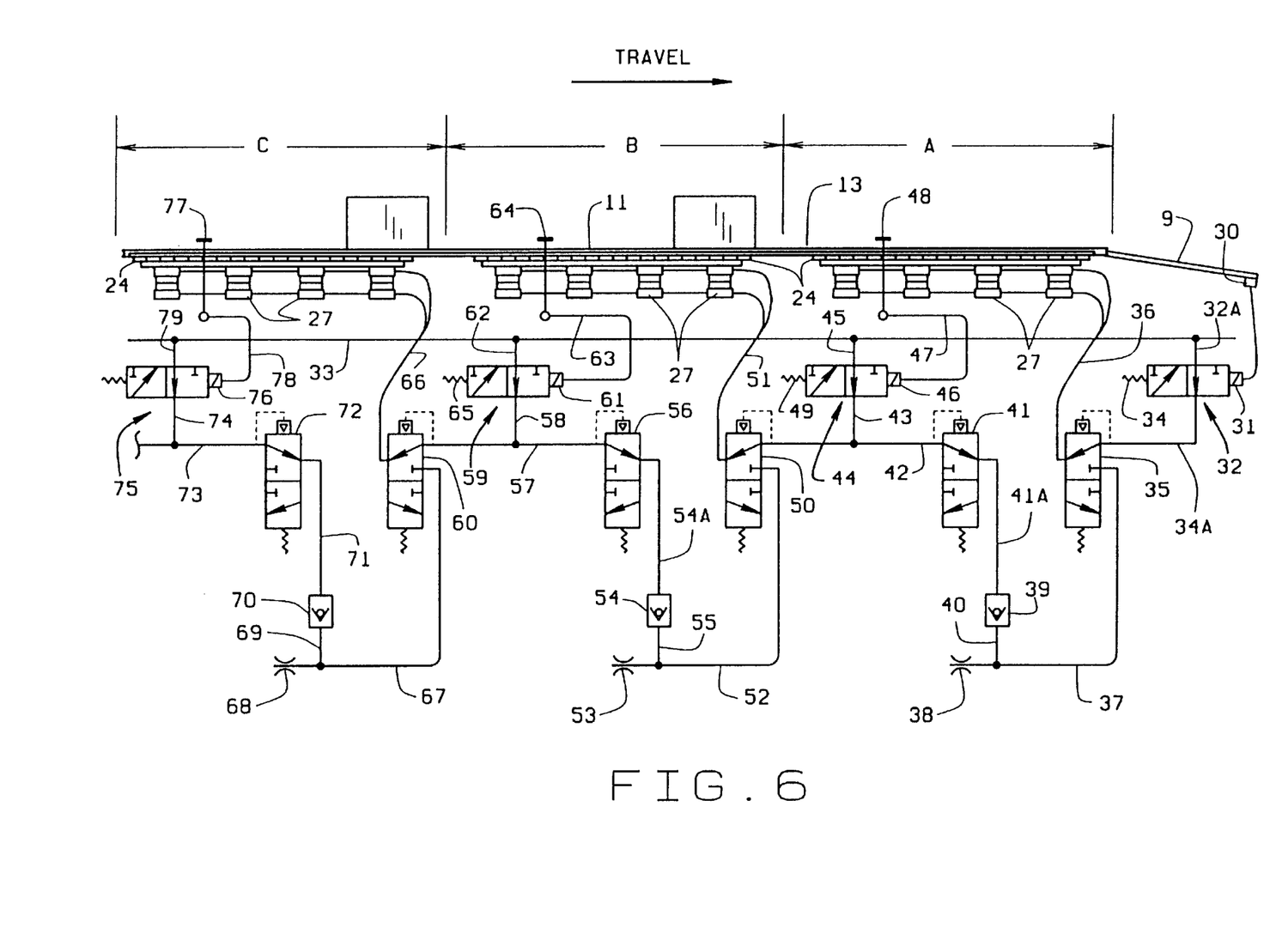
FIG. 6 is a schematic assembly of a control system associated with the conveyor seen in FIG. 2 with a package conveyor elevated to move packages normally along the conveyor without encountering accumulation of product.

In the conveyor arrangement of FIG. 6 there are shown three zones of the conveyor which are related in sequence so that if a leading conveyor zone indicates that packages are accumulating and are not being downloaded from the conveyor, the next trailing conveyor zone can be prepared to slow down on package transportation or stop and accumulate packages until the package accumulation in the leading conveyor zone is conditioned to resume transportation on the moving belt or for delivery off the conveyor belt 11.

In the present conveyor scheme it is to be understood that each zone in the conveyor 10 has a system of controls that are duplicated from zone to zone so that a pressure fluid valve in a leading transportation zone can signal the next trailing zone of the conveyor that packages are accumulating in the leading zone. The pressure fluid may be either a liquid or air as the pressurizing medium. What is being described in the following text will relate to the controlling device in each zone by terms that become duplicative so as to explain the control scheme being employed using air pressure.

For a conveyor system that has no problem of arresting or accumulating packages on a belt which can be elevated or lifted and lowered, there is shown in FIG. 6 a package discharge surface 9 having a sensor 30 to supply power to the solenoid 31 in a first valve 32 arranged to allow air from a primary air line 33 to flow from line 32A through line 34A to a second valve 35 which applies pressure through an internal passage seen in dotted line to hold the second valve 35 so air is able to flow into line 36 to expand the pads 27 to elevate the support plate for that zone A of the conveyor belt 11. So long as the packages run off surface 9 to maintain power from unit 30 to the solenoid 31 of valve 32, air from the supply line 32A will pass through the valve 32 to the line 34A and to the second valve 35 and to line 36 to elevate pads 27 for holding the belt 11 in FIG. 6 elevated. That second valve 35 is connected by line 37 to an orifice 38 and by line 40 to a check valve 39. That check valve 39 is held closed by pressure in line 41A from a third valve 41. That third valve 41 is influenced by the position in FIG. 6 by pressure in line 42 and 43 from a first valve 44 which is connected by line 45 to the pressure line 33. That first valve 44 is held in the position shown by current in lead 47 from a photocell 48 in zone A which has the belt 11 elevated to convey packages.

Continuing with FIG. 6, the first photocell 48 which is not blocked and is energizing solenoid 46 to position first valve 44 to supply air in lines 43 and 42 to a second valve 50 which is positioned by internal pressure to hold that second valve 50 to supply air into line 51 for pads 27 in zone B which holds the conveyor belt 11 elevated so that packages are free to be moved. The second valve 50 is connected by line 52 to an orifice 53 and to a check valve 54 by line 55. Check valve 54 is held closed by pressure supplied from a third valve 56 which is set in the position of FIG. 6 by pressure in line 57 from the line 58 connected to the first valve 59 which is under the control of a photocell 64 which is not blocked in zone B. Air from the main line 33 can pass by connection 62 through first valve 59 because photocell 64 is energizing solenoid 61 to hold that first valve 59 in the position shown in FIG. 6.

Continuing with FIG. 6, the second photocell 64 which is not blocked and is energizing solenoid 61 to position first valve 59 to supply air in lines 58 and 57 to a second valve 60 which is positioned by internal pressure in position to hold that second valve 60 to supply air into line 66 for pads 27 in zone C which holds the conveyor belt 11 elevated so that packages are free to be moved. The second valve 60 is connected by line 67 to an orifice 68 and to a check valve 70 by line 69. Check valve 70 is held closed by pressure supplied from a third valve 72 which is set in the position of FIG. 6 by pressure in line 73 from the line 74 connected to the first valve 75 which is under the control of a photocell 77 which is not blocked in zone C. Air from the main line 33 can pass by connection 79 through first valve 75 because photocell 77 is energizing solenoid 76 to hold that first valve 75 in the position shown in FIG. 6. Accordingly FIG. 6 shows free transportation of packages along its length of zone A, B and C.

It has been explained in FIG. 6 that there are three zones A, B and C, and each zone is associated with repetitive controls. For example, zone A is in the leading position and zone B is trailing, followed by zone C which trails zone B. Zone A discharges packages onto surface 9, but when surface 9 is blocked or has become nonfunctional, sensor 30 removes power from solenoid 31, allowing return spring 34 to shift first valve 32 as in FIG. 6A. When that happens, air in line 34A is exhausted through valve 32, shifting quick exhaust valve 35 to gradually lower zone A pads 27 by reason of air in pads 27 being slowly exhausted through line 36 to line 37 and out orifice 38. The fluid in line 40 is blocked at closed check valve 39 since the pressure in line 41A is higher than that of the air exhausting from line 37.

Figure 6A:
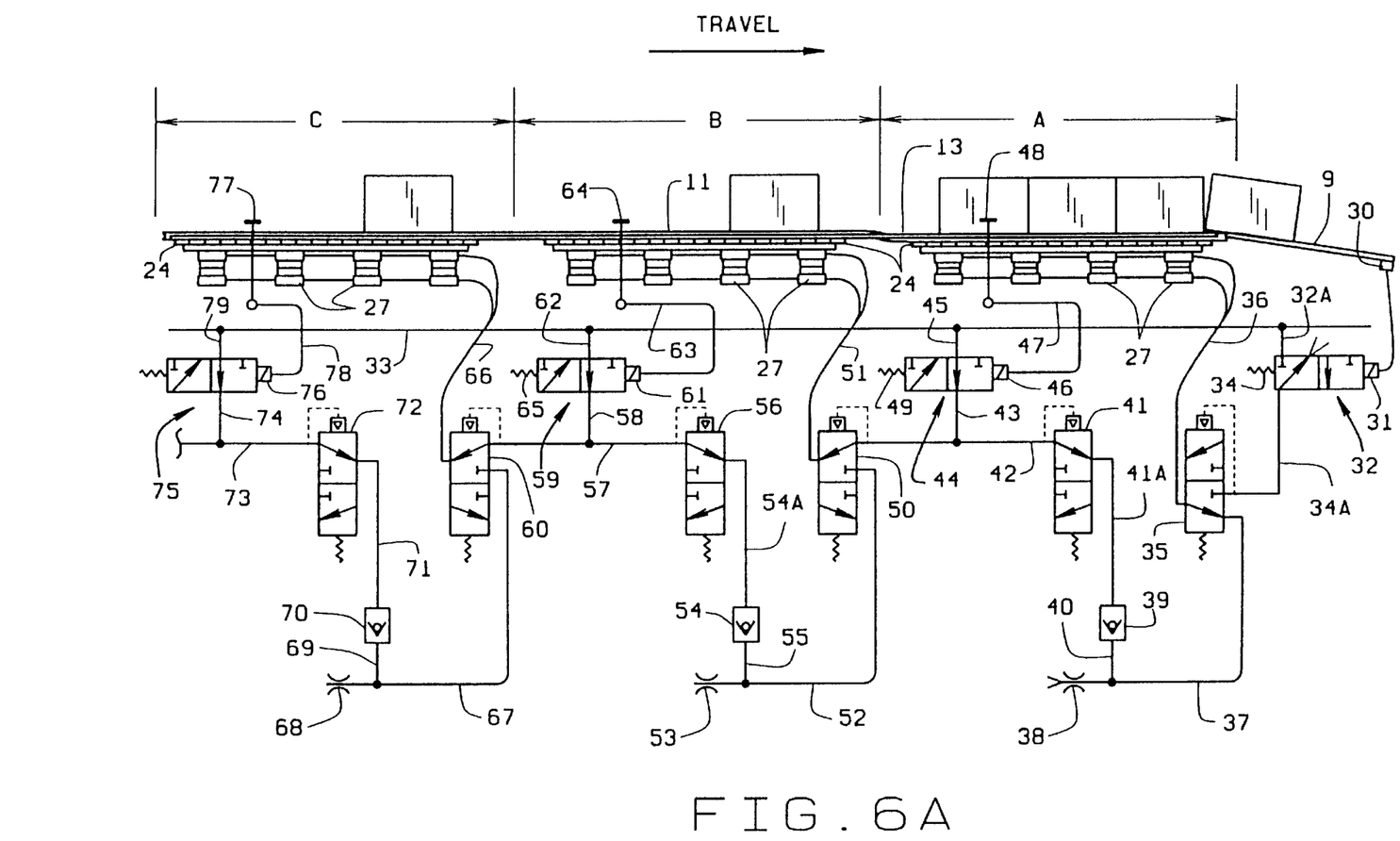
FIG. 6A is the condition of the schematic control system when the conveyor belt in zone A is being lowered due to accumulation of packages.

With surface 9 no longer accepting product, packages will begin to accumulate in zone A as in FIG. 6A. Since the air in pads 27 in zone A is being exhausted slowly, packages in transit on the conveyor are able to continue to fill zone A. The size of orifice 38 can be selected based on the rate at which packages are typically being fed to the conveyor, to result in the zone accumulating full of packages before enough air exhausts from pads 27 to set packages onto skids 13.

Figure 6B:
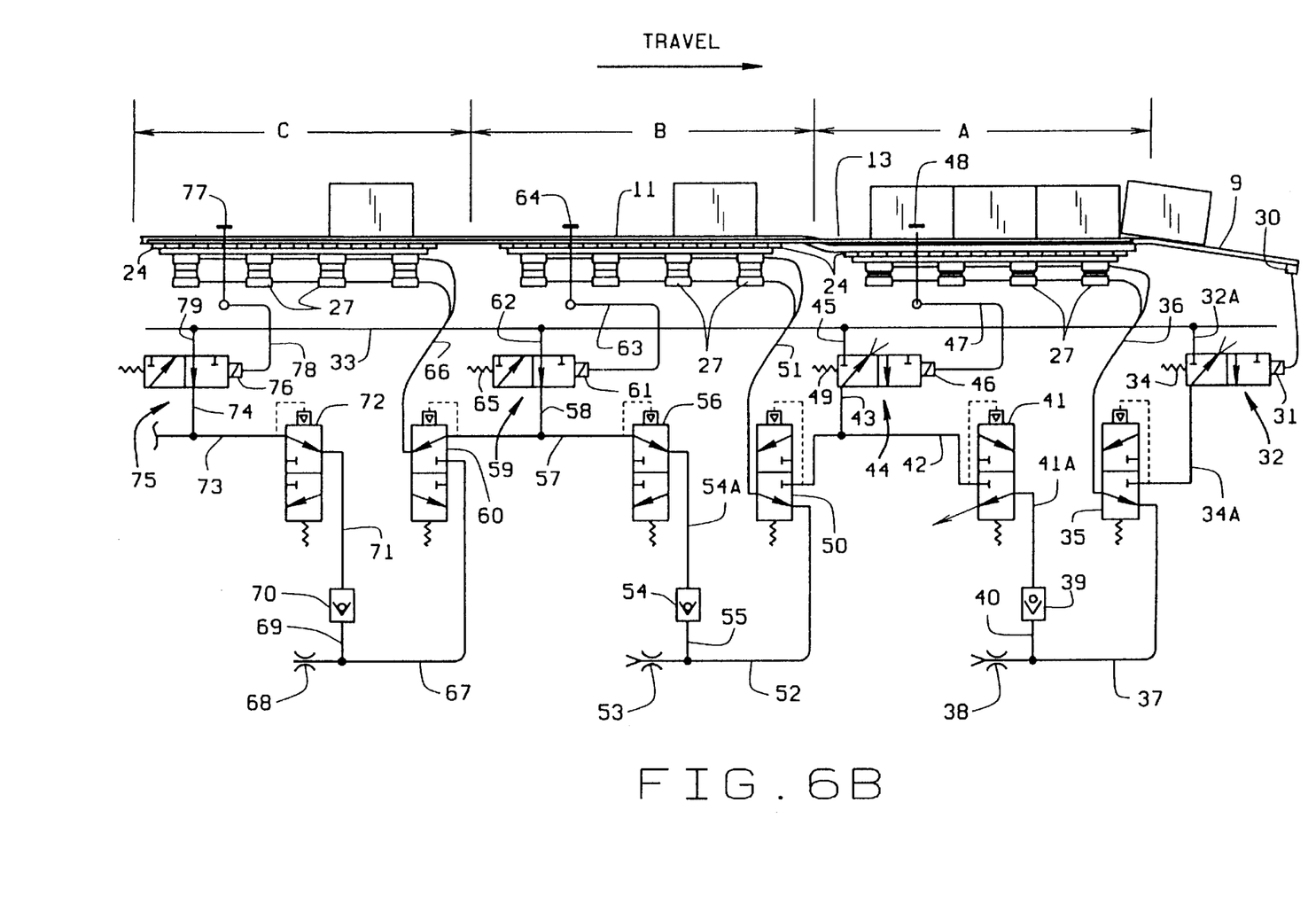
FIG. 6B is condition of the schematic control system when the conveyor belt lift pads are fully exhausted of air in zone A and the control system for the belt in zone B is rendered subject to the exhaust of the initial supply of air affecting the raised position of the conveyor belt in zone B.

Photocell 48 has a time delay function built in which allows packages passing by in a transportation mode to be ignored. However, when packages accumulate in zone A, photocell 48 will become blocked as in FIG. 6A. After being blocked for a preset time interval, power is removed from solenoid 46 so that valve 44 in FIG. 6B releases pressure from lines 43 and 42, which causes valve 41 to exhaust air in line 41A, thereby releasing check valve 39. Any air remaining in pads 27 in zone A is able to quickly exhaust from line 40 through check valve 39 and out valve 41. Thus the pads 27 will allow the belt 11 in zone A to lower quickly, thus avoiding an excessive build-up of package line pressure as additional packages accumulate. The uniqueness of this control scheme is that it provides a means to maximize accumulation density when the package flow rate is low, but avoids excessive package line pressure when the charge rate is high. The purpose of allowing air to escape at the orifice is to gradually lower the packages from belt 11 to skids 13 regardless of packages blocking photocell 48.

Figure 6C:
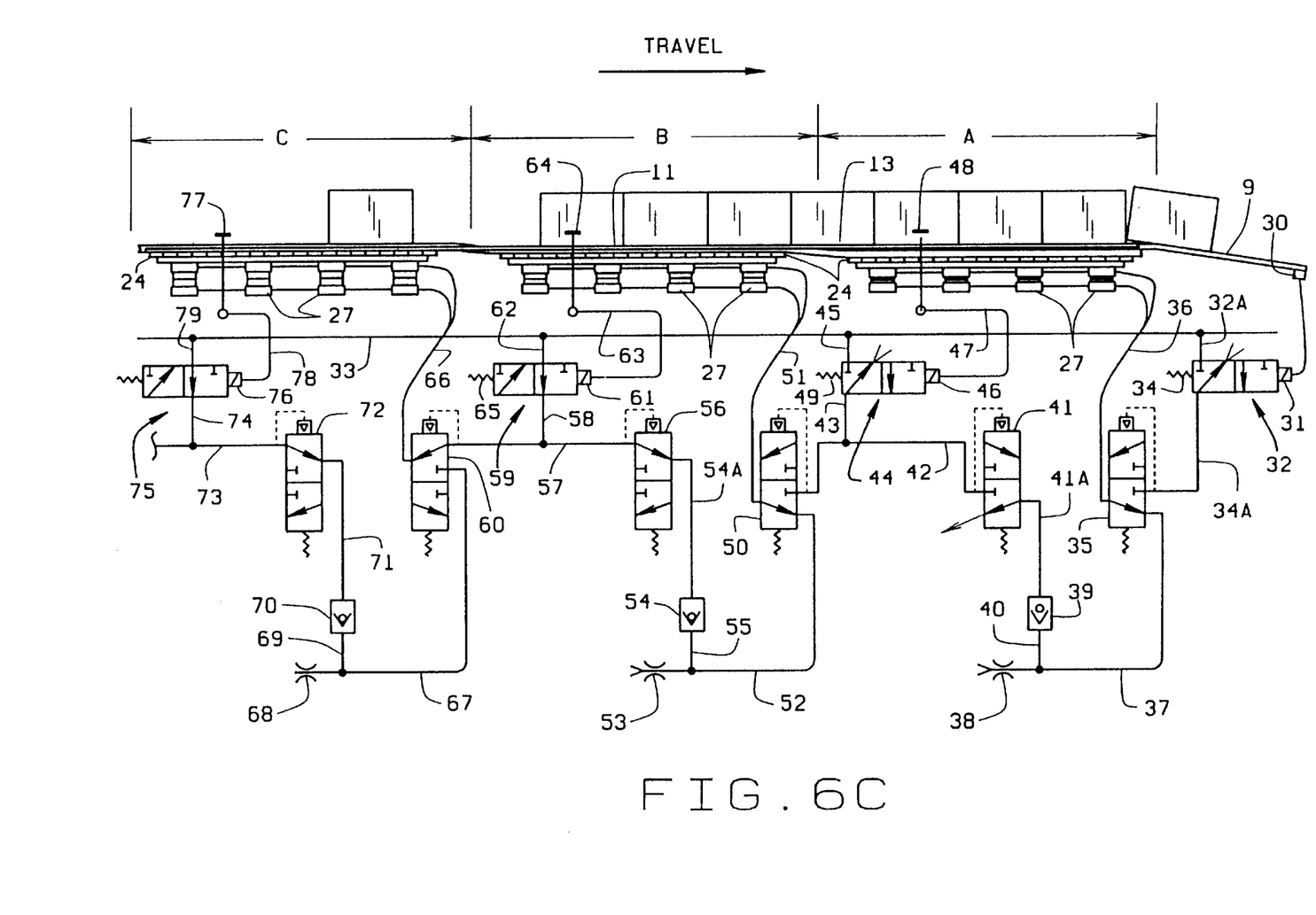
FIG. 6C is the condition of schematic control system to allow packages to begin accumulating in zone B while zone B is being lowered.
Figure 6D:
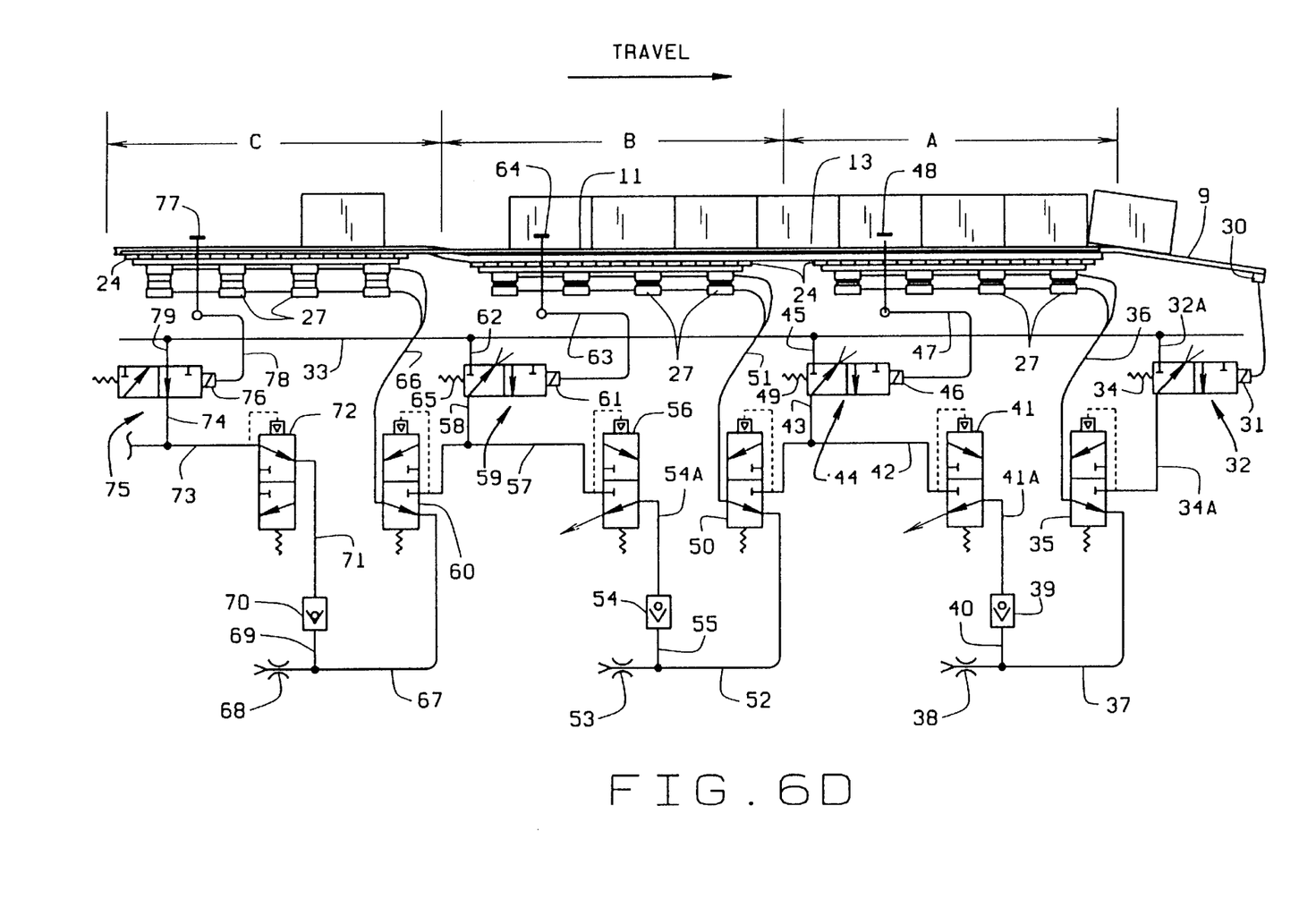
FIG. 6D is condition of the schematic control system when the pads supporting the conveyor belt are fully exhausted of air in zones A and B and air for belt in zone C is exhausting.

The exhausting of air from lines 42 and 43 as previously described will also cause the second valve 50 to begin slowly exhausting fluid from pads 27 in zone B through line 52 and orifice 53, but not through check valve 54 which is held closed at this time. Now zone B will accumulate packages until photocell 64 becomes blocked, as in FIG. 6C but has not timed out. After a time delay, the power to solenoid 61 will be cut off and valve 59 will shift to position in FIG. 6D. That shift opens line 57 to exhaust air to atmosphere and shifts valve 56 which allows the check valve 54 to open line 54A and the pads 27 in zone B will lower rapidly. Concurrently the valve 60 will open to begin exhausting the pads 27 in zone C as seen in FIG. 6D. That action of valve 60 will allow the air in pads 27 of zone C to slowly exhaust air at orifice 68, as check valve 70 is held closed by pressure from valve 72.

Figure 6E:
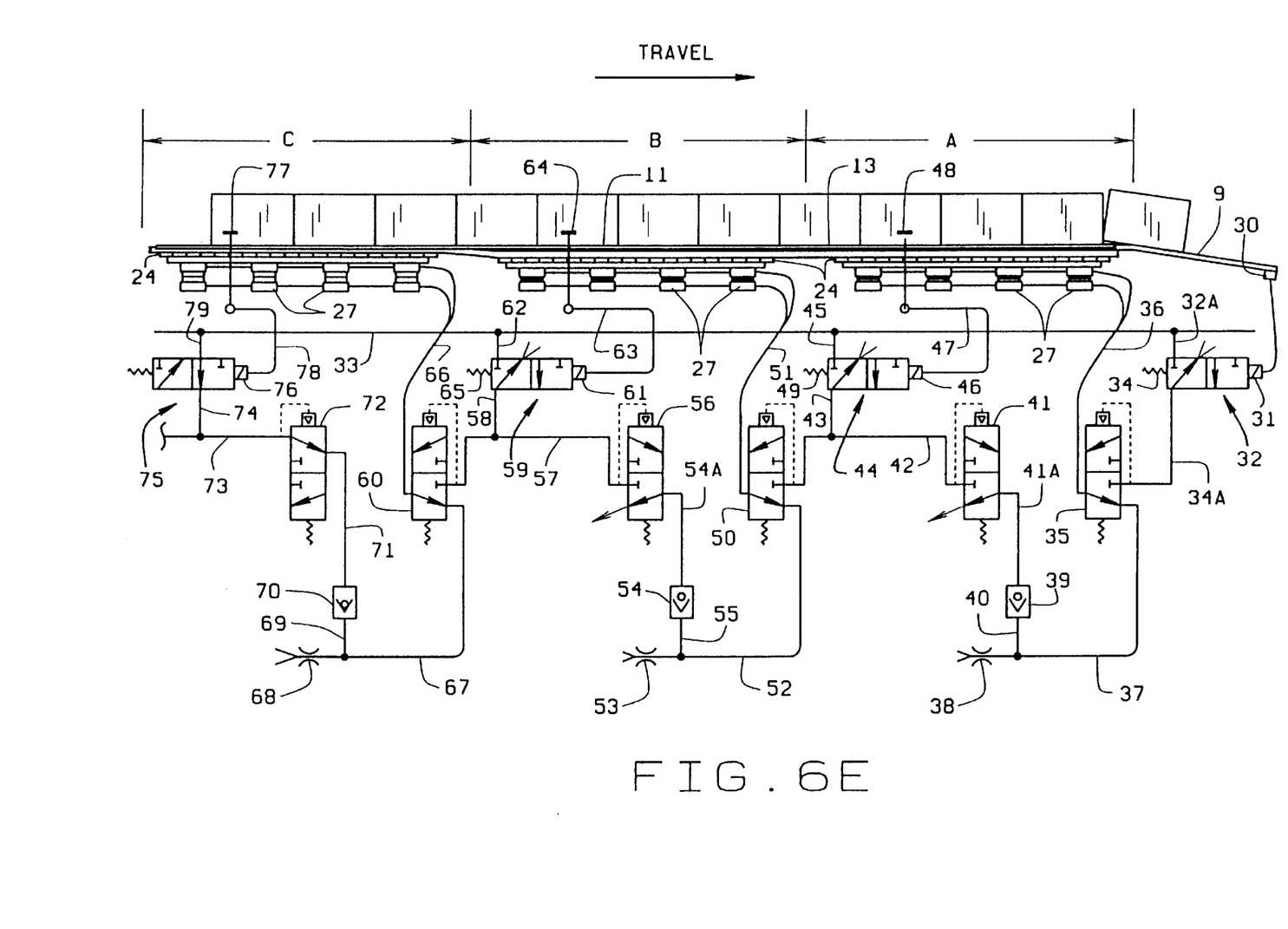
FIG. 6E is the condition of the schematic control system to allow packages to begin accumulating in zone C while zone C is being lowered.
Figure 7:
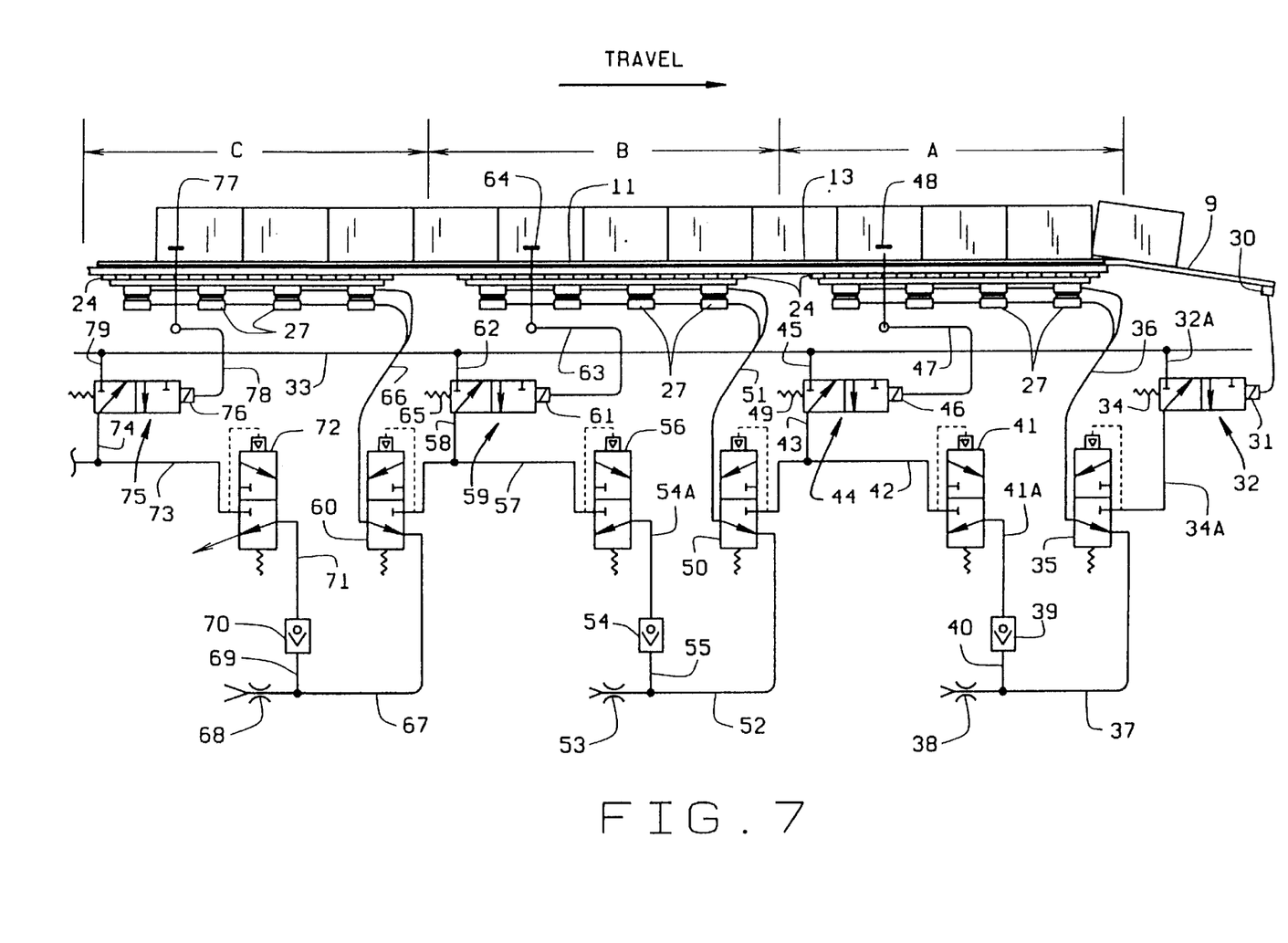
FIG. 7 is a schematic assembly view of the control system to further illustrate the multiple alignment of a plurality of conveyor zones on which accumulation of packages has taken place.

Zone C will accumulate packages until the photocell 77 is blocked in FIG. 6E. After the time delay of photocell 77 has time out as in FIG. 7 power in line 78 to solenoid valve 76 is cut off. That last event will be followed by the view of FIG. 7 which allow valve 72 to open check valve 70 which allows the pads 27 in zone C to exhaust air rapidly to lower the belt.

The events described taking place in zone A, B and C will continue down the conveyor 10 as long as the leading zone A of the conveyor continues to be blocked by accumulation of packages. When the surface 9 again allows passage of packages the control system will allow the zones A, B and C to progressively move packages until all zones transport packages.

Figure 8:
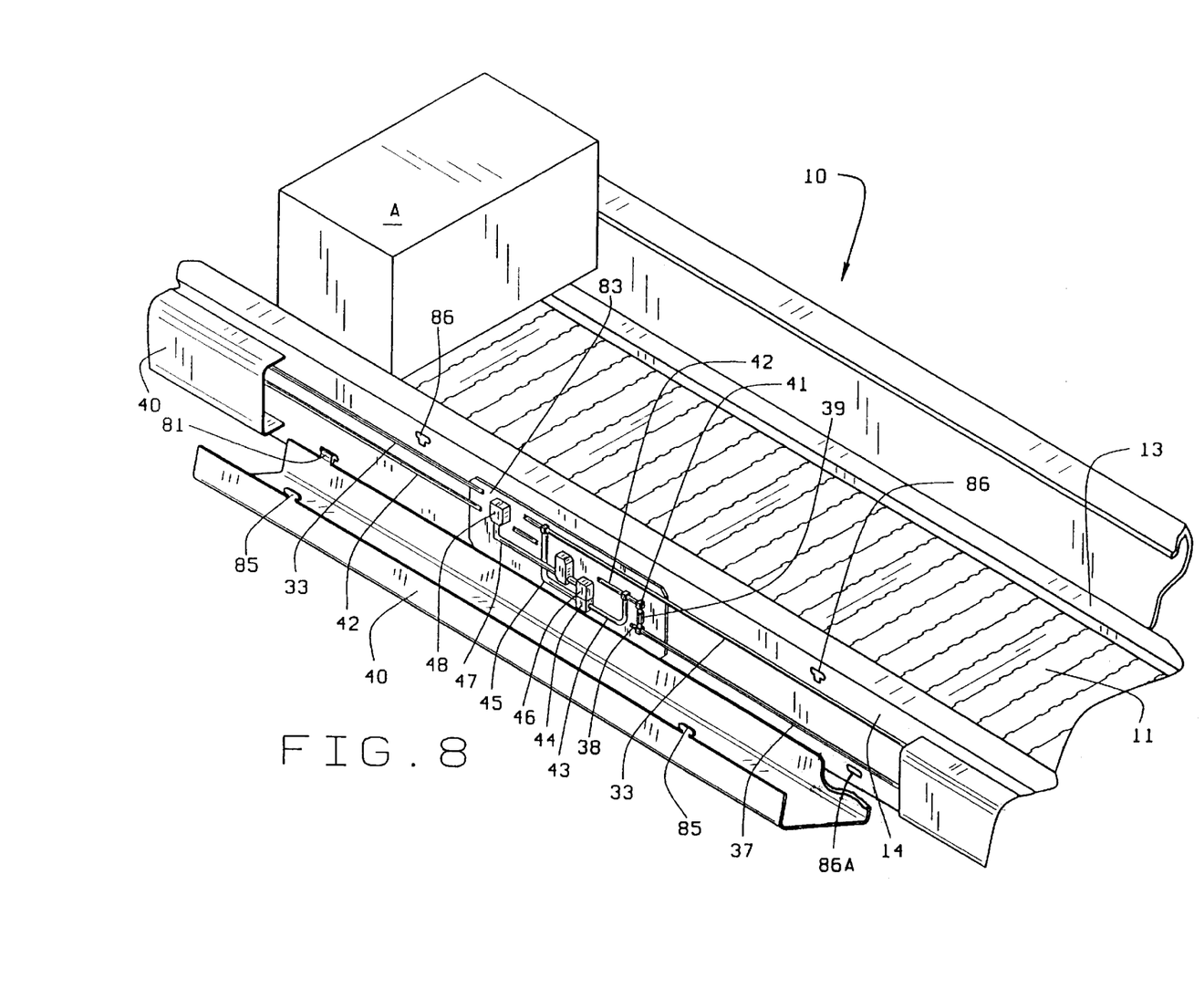
FIG. 8 is an enlarged and fragmentary schematic view of a conveyor provided with a service shelf carried at the side of the structure of the conveyor assembly so the controls employed in FIG. 4 can be accessed to effect adjustment or service of the controls schematically seen in FIGS. 6 and 7.
Figure 9:
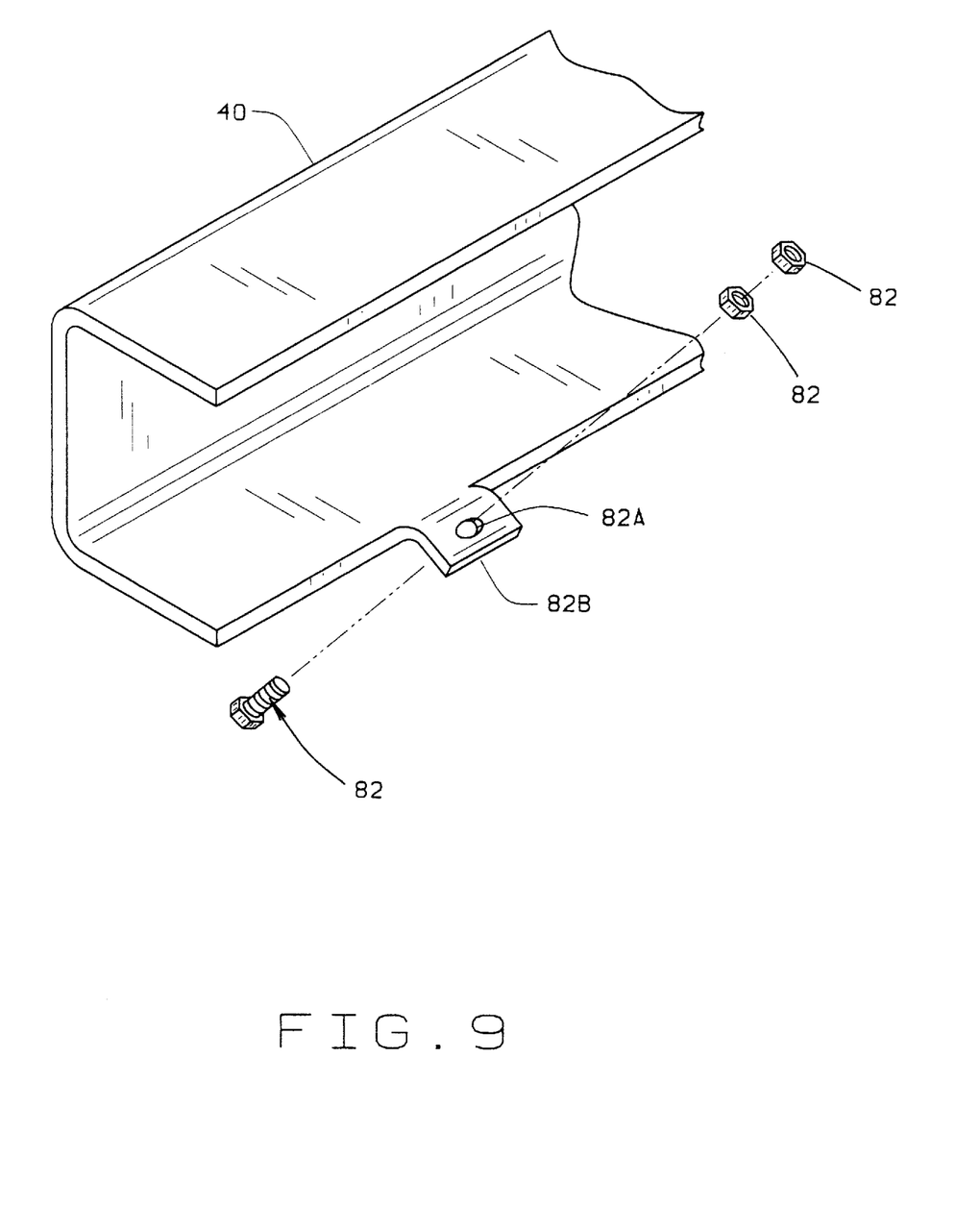
FIG. 9 is a partial perspective view of the removable cover showing the method of securing the hinge into the base member with the removable bolts.

The view of FIG. 8 illustrates a further object of the disclosure which has to do with the provision for enabling quick service to the control system when needed, all without the need to dismantle any of the structure carrying the conveyor belt and the supporting apparatus associated with it. The view of FIG. 8 is related with FIG. 3 where a side protective cover 40 has been opened for exposing the control assembly which is typical of any one of the zones shown in FIG. 6. The controls seen in FIG. 6, are duplicated for each assembly, are carried on a plate 83 attached to the side wall 14 of the conveyor frame. The photocell 48 (zone A) is seen on the plate 83 having its connection 47 to the solenoid 46. The principle air conduit 33 as well as the rest of the control assembly is depicted in a general way so it can be protected by the cover 40. The cover is attached to the side 14 by a pair of hinge leafs 81 (FIG. 3) spaced along the bottom edge of the cover 40. Each hinge leaf 81 is secured into longitudinally spaced openings 86A by removable bolts 82 A set of retainer elements 85 are T shaped tabs adapted to be fitted into T shaped opening 86. It is to be understood that the cover 40 can be retained by inserting the T shaped tabs 85 into the openings 86 and allowing the cover 40 to drop down so the tabs and opening gain a mutual engagement. Opening of the cover 40 requires a lifting movement to unlock the tabs 85 so the cover can be hinged out to present a work surface.

The package conveying system set forth in the preceding description includes a package conveying belt divided into zones in alignment, thus providing a substantially continuous path of travel through said alignment of individual supports having air pads subject to a supply of air under pressure for selectively elevating and lowering the conveying belt. A control system is operative on said conveyor belt air pads to detect movement of packages in the continuous path of travel such that should a leading zone of the belt conveyor support non-moving packages the control system has the ability to signal a trailing zone of the belt to change its positions to lower that position from a package support elevation to a belt lowering position and provide stationary means to assume the support of package so the conveyor belt movement is not interfered with and packages are supported so as to avoid trailing packages impacting on the packages in a leading zone of the conveying belt.

The photocells in the view of FIG. 6 are of a character that possesses a timing circuit to respond if a package holds a position to block the photocell for a time interval. Any of the convenient photocells with a solid state timing circuit can be used, such as Banner Engineering Corp. Econo-Beam Series can be selected.

It is also disclosed in the foregoing specification that the assembly of valves operative connected with conveyor belt offers an opportunity to simplify the control system.

What is claimed is:

1. A removable cover assembly for protecting control system components, comprising:

a base member to which control systems components can be attached, the base member having longitudinally spaced lower slots and longitudinally spaced upper openings;

a U-shaped cover having an upper flange and a lower flange connected by a sidewall;

a plurality of hinge members attached to the free end of the lower flange and located and sized to engage the longitudinally spaced lower slots on the base member and allow the cover to pivot around the slots to expose the base member when in open position, and fastening members positioned on the free edge of the upper flange and located and sized to engage and lock into the upper openings of the base member.

2. The cover assembly of claim 1 including removable lock members on the hinge members to retain the hinge members in the slots.

3. The cover assembly of claim 2 wherein each of the hinge members has a circular opening therein and the lock members are bolts removably positioned in said openings.

4. The cover assembly of claim 1 wherein the U-shaped cover, the hinge members and the fastening members are integral and formed from one piece of material.

5. The cover assembly of claim 1 wherein the cover is pivotable into substantially a horizontal open position to provide a work surface.

6. A cover system for protecting control system components, comprising:

a plurality of elongated slots placed some distance apart, said elongated slots being aligned along their longitudinal centers;

a plurality of T-shaped openings placed some distance apart, said T-shaped openings being aligned along their longitudinal centers;

a cover, said cover being generally channel shaped having an upper flange and a lower flange, the lower flange having a plurality of hinge leaves protruding from the edge of the lower flange at a downward angle of about 45 degrees, said hinge leaves located and sized to engage within the elongated slots, each said hinge leaf having an opening located within the hinge leaf, each hinge leaf having a removable bolt inserted into said opening, the upper flange having a plurality of generally T-shaped tabs protruding from the edge of the upper flange, said T-shaped tabs located and sized to engage the T-shaped slots.

7. A removable cover assembly for protecting control system components, comprising:

a base member to which control systems components can be attached, the base member having longitudinally spaced lower slots and longitudinally spaced T-shaped upper openings;

a U-shaped cover having an upper flange and a lower flange connected by a sidewall; and, a plurality of hinge members attached to the free end of the lower flange and located and sized to engage the longitudinally spaced lower slots on the base member and allow the cover to pivot around the slots to expose the base member when in open position, and T-shaped fastening members positioned on the free edge of the upper flange and located and sized to engage and lock into the upper openings of the base member, the longitudinally spaced T-shaped upper openings, the longitudinally spaced lower slots and the T-shaped fastening members being sized to lock the cover to the base by a downward movement of the cover relative to the base.

8. A removable cover assembly for protecting control system components, comprising:

a base member to which control systems components can be attached, the base member having longitudinally spaced lower slots and longitudinally spaced upper openings;

a U-shaped cover having an upper flange and a lower flange connected by a sidewall;

a plurality of hinge members attached to the free end of the lower flange and located and sized to engage the longitudinally spaced lower slots on the base member and allow the cover to pivot around the slots to expose the base member when in open position; and, a plurality of fastening members positioned on the free edge of the upper flange and located and sized to engage and lock into the upper openings of the base member, the plurality of hinge members and the plurality of fastening members being integral with the U-shaped cover and formed from one piece of material.

9. The cover assembly of claim 8 including removable lock members on the hinge members to retain the hinge members in the longitudinally spaced lower slots.

10. The cover assembly of claim 9 wherein each of the hinge members has a circular opening therein and the lock members are bolts removably positioned in said openings.

11. The cover assembly of claim 8 wherein the base member upper openings are T-shaped and the fastening members on the cover upper flange are T-shaped, the upper openings, the lower slots and the fastening members being sized to lock the cover to the base by a downward movement of the cover relative to the base.

12. The cover assembly of claim 8 wherein the cover is pivotable into substantially a horizontal open position to provide a work surface.

13. A removable cover assembly for protecting control system components, comprising:

a base member to which control systems components can be attached, the base member having longitudinally spaced lower slots and longitudinally spaced upper openings;

a U-shaped cover having an upper flange and a lower flange connected by a sidewall;

a plurality of hinge members attached to the free end of the lower flange and located and sized to engage the longitudinally spaced lower slots on the base member and allow the cover to pivot around the slots to expose the base member when in open position; and, a plurality of fastening members positioned on the free edge of the upper flange and located and sized to engage and lock into the upper openings of the base member, the plurality of hinge members and the plurality of fastening members being integral with the U-shaped cover and formed from one piece of material, whereby the cover can be opened and closed from the front by lifting the cover assembly vertically to disengage the fastening members.

14. A removable cover assembly for protecting control system components, comprising:

a base member to which control systems components can be attached, the base member having longitudinally spaced lower slots and longitudinally spaced upper openings;

a U-shaped cover having an upper flange, a lower flange connected by a sidewall, the sidewall having an inner surface;

a plurality of hinge members attached to the free end of the lower flange and located and sized to engage the longitudinally spaced lower slots on the base member, the base member longitudinally spaced lower slots and the hinge members being arranged to allow the U-shaped cover to pivot outwardly and downwardly until the lower flange engages the base member and retains the U-shaped cover in an open position at approximately 90 degrees with respect to the base member, whereby the inner surface of the sidewall forms a work surface; and, a plurality of fastening members positioned on the free edge of the upper flange and located and sized to engage and lock into the upper openings of the base member, the plurality of hinge members and the plurality of fastening members being integral with the U-shaped cover and formed from one piece of material, whereby the cover can be opened and closed from the front by lifting the cover assembly vertically to disengage the fastening members.

* * * * *